United States Patent [19]

Lassila et al.

[11] Patent Number: 5,739,209
[45] Date of Patent: Apr. 14, 1998

[54] AMINE CURATIVES FOR FLEXIBILIZED EPOXIES

[75] Inventors: Kevin Rodney Lassila, Allentown; Mark David Conner, New Tripoli, both of Pa.

[73] Assignee: Air Products and Chemicals, Inc., Allentown, Pa.

[21] Appl. No.: 797,796

[22] Filed: Feb. 7, 1997

Related U.S. Application Data

[62] Division of Ser. No. 437,476, May 9, 1995, abandoned.

[51] Int. Cl.$^6$ .................... C08G 59/44; C08G 59/50
[52] U.S. Cl. .................. 525/113; 528/103; 528/121; 528/124; 528/407
[58] Field of Search .................... 528/121, 124, 528/407, 103; 525/113

[56] References Cited

U.S. PATENT DOCUMENTS

| | | | |
|---|---|---|---|
| 3,013,020 | 12/1961 | Fancher et al. | 260/340.5 |
| 3,365,338 | 1/1968 | Hogsett et al. | 149/36 |
| 3,567,677 | 3/1971 | Donaetz et al. | 260/37 |
| 3,993,708 | 11/1976 | Brinkmann et al. | 260/830 |
| 4,435,558 | 3/1984 | Burba et al. | 528/45 |
| 5,098,780 | 3/1992 | Nemunaitis et al. | 428/312.4 |
| 5,371,288 | 12/1994 | Lassila et al. | 564/157 |
| 5,442,035 | 8/1995 | Corley et al. | 528/90 |

FOREIGN PATENT DOCUMENTS

| | | | |
|---|---|---|---|
| 3803508 | 8/1989 | Germany | 528/121 |

*Primary Examiner*—Frederick Krass
*Attorney, Agent, or Firm*—Mark L. Rodgers

[57] ABSTRACT

Reductive alkylation of branched, short chain diamines, such as 2-methyl-1,5-pentanediamine, with certain aldehydes or ketones of moderate molecular weight, such as benzaldehyde or methyl isobutyl ketone, produces novel tri- and difunctional amines which are useful in curing epoxy resins to compositions having improved flexibility and enhanced resistance to moisture and chemicals. Particularly favorable results are achieved when this curative is combined in the epoxy formulation with low molecular weight acrylic copolymers added as flexibilizers. Further improvements are available by including in the recipe monofunctional epoxy or acrylic reactive diluents.

6 Claims, No Drawings

AMINE CURATIVES FOR FLEXIBILIZED EPOXIES

This is a division of application Ser. No. 08/437,476 filed May 9, 1995, now abandoned.

BACKGROUND OF THE INVENTION

This invention relates to di- and trifunctional amines which are useful for curing epoxy resins to produce products having improved flexibility, and to the process for making such amine curatives. In another aspect it relates to a method of curing epoxy polymers with an amine curative that imparts higher elongation properties to the product. In still another aspect it relates to the epoxy resin product obtained using these novel amine curatives.

Polymeric epoxy resins have been widely used as coatings in both industrial and civil engineering applications because they can be made to adhere well to a substrate and provide good protection from moisture and chemicals. For some uses, however, such as in coatings for concrete structures, it has been difficult to develop resins having sufficient flexibility and elongation to withstand impact and cover shrinkage-induced cracks. Additives to the resin formulations or structural modifications of the polymer to improve elongation properties frequently result in loss of moisture and chemical resistance or compatibility problems which adversely affect strength and appearance.

One of the earliest methods of improving flexibility in epoxy resins was the addition of coal tar or similar material to the formulation. More recently the use of long chain modifiers or flexibilizers in the form of resins, curatives or reactive materials has been favored. Very high levels of such flexibilizers, on the order of 60 percent by weight or more, have often been necessary, increasing cost and adversely affecting other physical properties of the resin.

U.S. Pat. No. 3,567,677, Donaetz et al. (1971) discusses the need to improve the flexibility of epoxy potting compounds and addresses the problem by formulating diglycidyl ether of bisphenol A with diepoxide of polyglycol using a curative such as N-aminoethylpiperazine or its adduct with allylglycidyl ether.

U.S. Pat. No. 3,993,708, Brinkmann et al. (1976) describes improving the elasticity of hardened epoxy resins by using as the curative an amino-terminated hydrolysis product of adducts formed by reacting a polyether urethane with an enamine or ketimine having a hydroxy group. The enamine or ketimine is formed by reaction of alkanolamines with aldehydes or ketones.

U.S. Pat. No. 4,435,558, Burba et al. (1984) discusses the requirement of increased flexibility for epoxy resins used in construction because of shrinkage cracks which occur in concrete. It is stated that flexibility can be increased by reducing the crosslinking density in the polymer or by adding plasticizers. Burba et al. disclose a method of increasing elasticity in epoxy resin compositions by using a polyether urethane urea amino hardener which can be prepared from a polyfunctional aryl carbamate ester and polyfunctional amino compounds. A generic formula for suitable amines is given as R—NH—R$^1$—NH—R wherein R is hydrogen or alkyl of 1 to 4 carbons and R$^1$ is aliphatic, cycloaliphatic or araliphatic having 2 to 20 carbons. Methylpentamethylenediamine, 1,2-diaminopropane and N-aminoethylpiperazine are among amines disclosed as particularly suitable.

U.S. Pat. No. 5,098,780, Nemunaitis et al. (1992) also discusses the need for crack-bridging properties in concrete coatings and sets forth a solution by formulating an epoxy base coat having 50 to 400 percent elongation using a flexibilizing agent, e.g. a phenol blocked isocyanate. The curatives are modified cycloaliphatic amines and aliphatic polyamines, but no indication is given as to their modification.

Sometimes plasticizers such as nonyl phenol or benzyl alcohol are used to reduce the concentration of flexibilizer and decrease the cost of epoxy formulations, but the addition of such fugitive materials is undesirable because of safety and environmental concerns. There are a number of commercial tougheners on the market which can be used in high concentrations (e.g. 70%) to impart flexibility to epoxy formulations, but with a loss of moisture and chemical resistance, and sometimes poor resistance to ultraviolet radiation.

One of the most popular curatives for flexibilized epoxy formulations is aminoethylpiperazine (AEP) which has three active hydrogens per molecule rather than four as are present in common diamine curatives. It is believed that this curative imparts higher flexibility to the system by reducing crosslink density in the epoxy resin. Although AEP is readily available and inexpensive, the epoxies cured with this amine often are more water sensitive and subject to discoloration. Also, because AEP is highly reactive, its formulations have extremely short pot life, limiting the time during which an epoxy coating material is fluid enough to be applied. In addition, AEP, like other lower amines, is quite volatile, increasing its toxicity. Diethylene triamine (DETA), for example, is considered too toxic for many civil engineering applications.

BRIEF SUMMARY OF THE INVENTION

It has been found that certain alkylated diamines which can be made by reductive alkylation of alkylene diamines with aldehydes or ketones of moderate chain length serve as flexibilizing curatives for epoxy resin formulations without the disadvantages of prior art amine curatives. These diamine adducts can be represented by the structural formula:

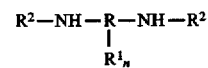

wherein: R is a straight chain alkylene group having 4 to 6 carbons,

R$^1$ is alkyl having 1 to 4 carbons, n is 1 or 2, one R$^2$ is alkyl or aralkyl having 5 to 15 carbons, and the other R$^2$ is H or alkyl or aralkyl having 1 to 15 carbons.

In accordance with the invention the above-described adducts are made by reacting a diamine corresponding to the structural formula:

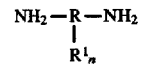

wherein: R is a straight chain alkylene group having 4 to 6 carbons,

R$^1$ is alkyl having 1 to 4 carbons, and n is 1 or 2, with a ketone or aldehyde corresponding to the structural formula:

wherein: $R^3$ is alkyl, aryl or aralkyl having 4 to 14 carbons, $R^4$ is H or alkyl, aryl or aralkyl having 1 to 10 carbons, and $R^3$ and $R^4$ together have 4 to 14 carbons, under hydrogen pressure and elevated temperature in the presence of a hydrogenation catalyst.

The amine adducts of the invention can be either di- or trifunctional, resulting from either di- or monoalkylation, respectively, but the trifunctional amines am preferred. The process of the invention produces these adducts in high yield. Products including di- and trifunctional adducts and position isomers can be separated from each other and from starting materials by fractional distillation, but, in general the adducts can be used as mixtures of isomers and multifunctional amines with a minimum of separation steps. It is preferred that the adducts be separated by functionality, which is relatively simple since there is a significant difference in molecular weight between the di- and trifunctional compounds as prepared by reductive alkylation of the diamine.

Epoxy resins curable according to the invention are polyepoxides which are resinous materials having a 1,2-epoxy equivalence greater than one. Polyepoxides of polyglycidylethers, such as polyglycidylethers of bisphenol A are preferred because of their demonstrated utility and commercial acceptability. The polyepoxide can be formulated with a reactive diluent such as an amine-reactive monofunctional material, such as a monofunctional epoxide or a monofunctional acrylate. Flexibilizers such as poly (acrylates) can also be included to advantage.

Cured epoxy resin compositions prepared in accordance with the above-described method exhibit improved elongation properties while retaining required tensile strength. These compositions also have excellent water and chemical resistance desired for epoxy coatings. The compatibility of the curative with the other formulation materials insures good appearance of the final product. A further advantage of the use of the curative of the invention to prepare epoxy compositions is an extended gel time which facilitates mixing and application of coating materials in the field.

DETAILED DESCRIPTION OF THE INVENTION

The amine adducts of this invention have been shown to be surprisingly effective in curing epoxy resin compositions to clear, colorless materials having good tensile and elongation properties, making them highly suitable for use as industrial and engineering coatings to protect substrates, such as concrete structures, from the adverse effects of atmospheric conditions, such as moisture and acidic pollutants. These adducts can be di- or trifunctional or a mixture of di- and trifunctional amines when used in curing epoxy compositions. It is preferred to use these amine adducts in their predominantly trifunctional, or monoalkylated, form as it is believed that such adducts provide more formulation options for achieving desired results.

Adducts having the structural formula given above under the "Summary" section can be made very readily in high yield by reductive alkylation of a diamine with a ketone or aldehyde. Discussions of reductive alkylation are given by Rylander, *Catalytic Hydrogenation over Platinum Metals*, Chapter 16, pp. 291–303, Academic Press, N.Y. 1967, and Rylander, *Hydrogenation Methods*, Chapter 6, pp. 82–93, Academic Press, N.Y. 1985. These chapters are directed primarily to alkylation of ammonia and aromatic amines with aldehydes or ketones. While this general reaction is broadly known, it is believed that the reaction has never been used or suggested for the particular compounds used as starting materials in our invention.

The amines to be employed are diamines having branching in the aliphatic structure of the molecule which has a relatively short chain of 4 to 6 carbon atoms connecting the two amine groups, with lower alkyl (1 to 4 carbons) substituted on the alkylene chain to provide the branching. The preferred diamine is 2-methyl-1,5-pentanediamine, although other diamines can be used, such as 3-methyl-1,5-pentanediamine, 2-ethyl-1,6-hexanediamine, 2,4-dimethyl-1,5-pentanediamine, 2-methyl-1,4-butanediamine, 2,4-dibutyl-1,6-hexanediamine, 2-methyl-4-ethyl-1,5-pentanediamine, and the like.

Either a ketone or an aldehyde can be used with equal efficiency in the reaction provided they are of sufficient molecular size to provide a significant hydrocarbon substituent on one or both amine groups. While not to be bound by theory, it is believed that it is the combination of reduced functionality plus the hydrocarbyl structure of the amine adducts which produces the unique result observed in curing epoxy compositions. The ketone or aldehyde, therefore, should conform to the structure described in the Summary. Suitable aldehyde or ketone starting materials include methyl isobutyl ketone, benzaldehyde, acetophenone, 2-tridecanone, 2-ethylhexanal, isovaleraldehyde, diisobutyl ketone, and the like. In the formula for the ketones, $R^3$ and $R^4$ can be joined to form a ring, as in cyclohexanone.

The reductive alkylation reaction is carried out in the liquid phase under hydrogen pressure and at elevated temperature. Conventional hydrogenation catalysts, such as palladium or rhodium on carbon, are suitable. Several hours should be allowed for the reaction to take place, after which the reactor is vented, catalyst filtered out, and the adduct products recovered by fractional distillation.

The epoxy resins which are formulated and cured according to the invention are polyepoxides having a 1,2-epoxy equivalence greater than one. A number of examples of suitable epoxy resins are given by Lee and Neville, *Handbook of Epoxy Resins*, McGraw-Hill, New York, 1967. The preferred polyepoxides are polyglycidylethers, particularly polyglycidylethers of bisphenol A. Other useful epoxy resins include cycloaliphatic polyepoxides which are prepared by epoxidation of cyclic olefins. The preferred epoxy resin or resin mixture has an epoxide equivalent weight (EEW) in the range of 150 to 2500, and in the case of bisphenol A resins, it is particularly convenient to use a resin having an EEW of 150 to 250, and preferably 190, which allows the resin to be in the liquid form. Liquid resins are preferred for formulation according to the invention since formulation can be carried out without addition of volatile organic compounds (ie., in a solvent-free manner), diminishing environmental and safety concerns.

The epoxy resin is generally present in the curable formulation in from 25 to 75 percent based on the total weight of the cured product, depending upon the specific use intended. The specific amine adduct selected as the curative also depends upon the desired flexibility of the cured product and the nature of other additives in the composition, such as added flexibilizers or reactive diluents. Preferably the functionality of the adduct is three, that is each molecule contains three active hydrogen atoms, but as a practical matter, mixed difunctional adduct will lower the total effective functionality of the curative. Also, unreacted diamine starting material which is not completely separated from the recovered product will tend to increase the average functionality. Generally, as the functionality of the curative is lowered, the amount of added flexibilizer or reactive diluent can also be lowered to maintain a desired percent elongation. In this way one can obtain better control of the epoxy resin properties. To obtain higher elongations, one can increase the level of added flexibilizer and/or reactive diluent. An advantage of the amine adducts of 2-methyl-1,5-pentane diamine is that several of them demonstrate very similar performance, so that the choice of specific amine adduct can be based on such considerations as cost, ease of use or resistance to ultra violet light. In addition, these curatives are water-white, do not yellow or readily form carbamates, and have low odor compared to commonly used curatives for epoxy resins.

In addition to the epoxy resin and amine curative, it is often desirable to include a flexibilizer in the formulation. As pointed out in the "Background" section, there are a number of epoxy flexibilizing additives available on the market, such as Dow Chemical's DER 732 and 736, which are epoxy terminated polyether polyols, HI-TEK's CMD-8303, which is an amine terminated polymer, Rhone-Poulenc's 58005, which is a carboxy-terminated polybutadiene/acrylonitrile rubber, B. F. Goodrich's AEW980, which is an amine-terminated polybutadiene/acrylonitrile rubber, and Celanese's EPI REZ 505, which is an epoxidized castor oil. It is, however, preferred to use certain acrylate copolymers that have recently been developed for this purpose. These are low molecular weight poly(acrylate) compositions in which esters of acrylic acid make up the major component with the minor component being epoxy or amine reactive, ethylenically unsaturated comonomers. By "low molecular weight" is meant having a number average molecular weight ($M_n$) in the range of 1000 to 6000 daltons, preferably 2000 to 3000 daltons, and a weight average to number average ratio of molecular weights ($M_w/M_n$) in the range of 1 to 3.5. Acrylate modifiers which are higher or lower in molecular weight than indicated result in decreased performance and compatibility. Also, acrylate flexibilizers which are higher in molecular weight than indicated will increase formulation viscosity making mixing more difficult.

Examples of acrylic acid esters which can be used to make the acrylate flexibilizer include $C_1$ to $C_{18}$ alkyl acrylates and methacrylates, acrylamide and methacrylamide, $C_1$ to $C_{18}$ acrylamides and methacrylamides, polyether esters of acrylic acid and methacrylic acid, hydroxyl and tertiary amine functional esters of acrylic acid and methacrylic acid, and the like. Mixtures of monomers can be used to form the base monomer package. In such mixtures, any desirable comonmer can be used, such as styrene, alpha-methyl styrene, vinyl esters, dialkyl maleates, and the like. The most preferred comonomers are the alkyl acrylates and more specifically, the $C_2$ to $C_6$ alkyl acrylates. In general, however, any combination of such monomers which produces a copolymer with a $T_g$ less than about 25° C. can be used.

The comonomer used in forming the acrylate flexibilizer is an ethylenically unsaturated monomer which has epoxy or amine or alcohol reactive functional groups. Examples of such functional groups include carboxylic acid groups, carboxylic anhydride, isocyanato, hydroxyl, epoxy, aldehyde (e.g., acrolein and methacrolein), siloxyl, halogen, and the like. Examples of hydroxyl group containing monomers include hydroxyethyl acrylate and methacrylate and hydroxybutylacrylate. Examples of acid containing functional monomers include acrylic and methacrylic acid, maleic acid, crotonic acid, itaconic acid, and the like. Examples of other possible comonomers include trimethoxysilylpropylmethacrylate, chloroethylacrylate, glycidyl acrylate and methacrylate, isocyanatoethylmethacrylate, chlormethylstyrene, and the like. The preferred functional comonomers are acrylic acid and maleic anhydride. The preferred amount of functional comonomer in the flexibilizer is from 1 to 15 percent, most preferably 3 to 12 percent by weight of the acrylate copolymer. Polymerization methods for such copolymers are well known in the art.

In addition to or instead of a flexibilizing additive, a reactive diluent can be included in the epoxy formulation. These can be monofunctional epoxy or acrylate compounds as described in U.S. Pat. No. 5,334,654 of Starner et al. Broadly, the reactive diluent can by any compatible amine-reactive monofunctional material since its function in the curing step is to react with the curative and, being monofunctional, reduce crosslink density. Generally this compound is aliphatic in character, having a substituent which is reactive with amine hydrogen. Preferably such a diluent is a monofunctional epoxide, such as a $C_{12}$ to $C_{14}$ alkyl glycidyl ether, or a monofunctional acrylate, such as 2-ethylhexylacrylate. Other monofunctional glycidyl ethers or acrylates or methacrylates, such as those disclosed by Starner et al., can also be used to dilute the crosslinking potential of the epoxy resin.

The relative amounts of polyepoxy compound, monofunctional diluent and flexibilizer, if used, can vary broadly, depending upon the specific compounds selected, and generally follow recipes well known in the art, for example as set forth in the Starner et al. patent. As a guide, one can expect to use about 40 to 85 parts by weight of polyepoxy compound, 5 to 40 parts of reactive diluent, and 10 to 40 parts of flexibilizer per 100 parts of amine-reactive components. The amount of curative is generally the stoichiometric quantity, more or less, required to react with the amine hydrogen reactive functions present in the formulation. This is in accordance with standard epoxy resin recipes.

The combination of the curative of this invention with a flexibilizing acrylate copolymer and a reactive monofunctional diluent in epoxy resin formulations provides a very potent tool for tailoring epoxy resin properties to suit a given use. The flexibilizing agent supplies a soft or rubbery segment which assists in developing the desired elongation property, while the amine curative and reactive diluent combine to control crosslink density in the cured epoxy resin. Lowering the crosslink density results in greater elasticity in the cured resin and the specific amine curatives of this invention increase both compatibility of the components and water and chemical resistance of the final product. The products can, therefore, be used advantageously as protective coatings and undercoatings, cast films and potting compounds in electrical applications.

In order to illustrate further the invention and its advantages, the following Examples are given, the specific nature of which should not be construed to limit the invention unduly.

EXAMPLE 1

This example describes the preparation of an adduct of methyl isobutyl ketone (MIBK) and 2-methyl-1,5-pentanediamine.

A one-liter autoclave was charged with 2-methyl-1,5-pentanediamine (300 g, 2.6 mol), methyl isobutyl ketone (260 g, 2.6 mol) and a 5% palladium on carbon catalyst (10 g). The reactor was sealed and the air in the reactor removed by three pressure/vent cycles with nitrogen. The nitrogen was then removed with three pressure/vent cycles with hydrogen, ending at a reactor pressure of 800 psig. Part of the hydrogen was vented and the reaction mixture was heated to 120° C. When the contents of the reactor reached temperature the pressure was raised to 770 psig. The reaction was maintained at these conditions for 72 hours, at which time gas uptake was complete. The reactor was then vented, hydrogen in the headspace replaced with nitrogen, and the catalyst removed from the contents by filtration. Gas chromatographic analysis of the product using a flame ionization detector provided an assay of 2.8 area percent of the starting material 2-methyl-1,5-pentanediamine, 80.8 percent monoalkylated isomers, and 13.9 percent N,N'-dialkylated amine. The products were identified by gas chromatography-mass spectrometry (GCMS).

The product (470.0 g) was purified by fractional vacuum distillation using a 21×1.5 cm column provided with stainless steel packing and the fractions were analyzed by capillary column gas chromatography with the results obtained in area percent. The product boiling between 98° and 106° C. at 2 mm Hg weighed 308.2 g and analyzed 98 percent monoalkylate (adduct of 2-methyl-1,5-pentanediamine and methyl isobutyl ketone) and 1.8 percent dialkylate. The fraction boiling between 108° and 128° C. at 2 mm Hg was 44.2 grams analyzed as 50.5 percent dialkylate and 47.4 percent monoalkylate. The bottoms were 86.5 percent dialkylate. Material boiling between 55° and 98° C. was mostly starting 2-methyl-1,5-pentanediamine. The monoalkylates were a mixture of position isomers, in approximately equal amount (53 and 45 percent) depending upon which amine group was alkylated. This product was water-white, had a low viscosity (<10 cps) and had low odor compared with the diamine starting material.

EXAMPLE 2

This example describes the preparation of an adduct of acetophenone and 2-methyl-1,5-pentanediamine.

A one liter round-bottomed flask was charged with 2-methyl-1,5-pentanediamine (348 g, 3.0 mol) and acetophenone (361 g, 3.0 mol). The reaction mixture was heated under nitrogen at 78° C. overnight and then at 90° C. for four hours. The contents of the flask were transferred to a one liter autoclave, 2.53 g of 5% palladium on carbon catalyst was added, and the material was hydrogenated to 75° C. and 750 psig for eight hours. The catalyst was removed by filtration and the monoalkylate purified by vacuum distillation. The product boiling at 124° to 126° C. weighed 278 g. It was identified by GCMS as a mixture of monoalkylated isomers.

EXAMPLE 3

This example describes the preparation of an adduct of benzaldehyde and 2-methyl-1,5-pentanediamine.

A clean, dry one liter autoclave was charged with 2-methyl-1,5-pentanediamine (348.5 g, 3.00 mol) followed by slow addition of benzaldehyde (318 g, 3.00 mol). Catalyst (5% palladium on carbon, 2.549 g) was added and the reactor contents were hydrogenated at 120° C. and 750 psig using standard procedures. Gas uptake was complete in about four hours. Gas chromatographic analysis of the crude product provided an assay of 5.0 area percent unreacted starting amine, 69.7 percent monoalkylated isomers, and 24.9 percent N,N'-dialkylate. The products were identified by GCMS. The pure monoalkylate (272 g) was isolated by vacuum distillation as a mixture of isomers boiling at 138° to 139° C. at 0.4 mm Hg.

EXAMPLE 4

This example describes preparing an adduct of 2-ethylhexanal and 2-methyl-1,5-pentanediamine.

To a one liter round-bottomed flask containing 290.3 g (2.5 mol) of 2-methyl-1,5-pentanediamine was added slowly under nitrogen over a period of 50 minutes using an addition funnel 2-ethylhexanal (320 g, 2.5 mol). The temperature increased to 66° C. A portion of this material (608 g) and 2.553 g of 5% rhodium on carbon were charged to a one liter autoclave and the material was hydrogenated at 177° C. and 740 psig. After 24 hours under these conditions the reaction was discontinued and the catalyst removed by filtration. The monoalkylates were isolated by vacuum distillation and the material boiling at 126° to 129° C. at 0.4 mm Hg was collected. This product (230 g) was identified by GCMS as a mixture of monoalkylated isomers.

EXAMPLE 5

This example describes the preparation of an adduct of 2-tridecanone and 2-methyl-1,5-pentanediamine.

The 2-tridecanone (299.4 g, 1.51 mol) and 2-methyl-1,5-pentanediamine (176 g, 1.51 mol) were combined in a one liter round-bottomed flask. A slight exotherm was noted. When the contents had cooled to room temperature, they were transferred to a one liter autoclave containing 2.017 g of 5% palladium on carbon catalyst. The hydrogenation was carried out at 130° C. and 750 psig using standard procedures. Gas uptake ceased after 23 hours. Monoalkylate (267 g) was isolated as a mixture of isomers by vacuum distillation at 174° to 176° C. at 2.1 mm Hg.

EXAMPLES 6–9

Epoxy resin formulations were prepared and cured to provide specimens for testing of the cured epoxy resin's tensile strength and elongation to determine flexibility of the products. Elastomeric epoxies were obtained by thoroughly mixing 80 parts by weight of the polyepoxide, diglycidyl ether of bisphenol A having an EEW of 190, 20 parts of a $C_{12}$ to $C_{14}$ monoglycidyl ether as a reactive diluent, and 53 parts of a polyacrylate flexibilizer (either a 95/5 copolymer of butyl acrylate and acrylic acid in Example 6, or a 90/10 copolymer of butyl acrylate and acrylic acid in Examples 7, 8 and 9). A curative made as described in Examples 1, 2 or 3 in various parts by weight was then added to the blend followed by additional thorough mixing and degassing at 10 mm Hg. The fraction of the curative used in each case was the mixture of monoalkylate isomers which were trifunctional in the curing reaction with the epoxy polymers. The epoxy blends were then cured at 70° C. for 20 hours in plaque-forming molds. Specimens were die cut from the cured plaques and the tensile properties measured according to ASTM D-638 protocol. Results are given in Table 1.

TABLE 1

| Example | Curative from Example | Pts. by Wt. | Tensile (psi) @ Yield | Tensile (psi) @ Break | Elongation Percent |
|---|---|---|---|---|---|
| 6 | 1 | 33.2 | 867 | 867 | 121 |
| 7 | 1 | 33.2 | 1158 | 1158 | 121 |

TABLE 1-continued

| Exam-ple | Curative from Example | Pts. by Wt. | Tensile (psi) @ Yield | @ Break | Elongation Percent |
|---|---|---|---|---|---|
| 8 | 2 | 36.5 | 1459 | 1459 | 125 |
| 9 | 3 | 34.2 | 1515 | 1515 | 114 |

The data of Table 1 show that epoxy resin compositions cured with the adducts of the invention have satisfactory tensile strength and excellent elongation for the desired applications for a flexible resin. Examples 6 and 7 used the adduct made from methyl isobutyl ketone while Example 8 used the adduct made from acetophenone and Example 9 used the adduct made from benzaldehyde. All three of these curatives exhibited very similar behavior in this application, offering flexibility of choice in formulations made according to the invention. The appearance of all four plaques was excellent, being clear and colorless in each instance.

COMPARATIVE EXAMPLES 10–13

Except as indicated the procedures of Examples 6–9 were repeated using aminoethylpiperazine (AEP) as a trifunctional curative instead of the adducts of the invention. AEP is an accepted commercial curative for epoxy resins. Weight ratios of the curative were adjusted to provide approximately the same equivalent weights in each case. Example 10 used as a flexibilizing additive a 95/5 copolymer of butyl acrylate and acrylic acid, the same as Example 6. Examples 11 and 12 used a 90/10 copolymer of butyl acrylate and acrylic acid, the same as Examples 7–9, while Example 13 used 124.5 parts of a 95/5 copolymer of butyl acrylate and maleic anhydride. The curing conditions for Example 13 were also changed to a room temperature cure for 5 months to see if the AEP cured resins would improve over time. An attempt was made in Example 12 to increase the flexibility of the resin using the AEP curative by increasing the proportion of reactive diluent to 30 parts while reducing the polyepoxide to 70 parts. Tensile and elongation properties of the cured plaques were measured and are reported in Table 2.

TABLE 2

| Exam-ple | Curative from Example | Pts. by Wt. | Tensile (psi) @ Yield | @ Break | Elongation Percent |
|---|---|---|---|---|---|
| 10 | AEP | 19.2 | 778 | 778 | 13 |
| 11 | AEP | 23.6 | 2836 | 2836 | 51 |
| 12 | AEP | 22.7 | 1379 | 1379 | 84 |
| 13 | AEP | 24.5 | 1620 | 1620 | 59 |

The appearance of these plaques was quite different from the plaques of Examples 6–9, these AEP cured plaques being opaque and either yellow or light brown. The physical properties reported in Table 2 further show that the AEP cured resins, while having tensile strength equivalent to that of the resins of the invention, were definitely inferior in elongation.

EXAMPLES 14 and 15

Two additional plaques were made following the procedure of Example 6 except for the omission of the reactive diluent, the monoglycidyl ether, and increasing the proportion of the polyepoxide to 100 parts by weight. Also, in Example 14 the poly(acrylate) flexibilizer used was a 90/10 copolymer of butyl acrylate and acrolein and in Example 15 the poly(acrylate) flexibilizer used was a 95/5 copolymer of butyl acrylate and maleic anhydride. Somewhat different amounts of the adduct of methyl isobutyl ketone and 2-methyl-1,5-pentanediamine (monoalkylate) were used as curative. The plaque of Example 14 was clear and very light yellow while that of Example 15 was translucent and very light brown. Physical properties are reported in Table 3 along with data on Comparative Examples 16 and 17.

COMPARATIVE EXAMPLES 16 and 17

Two plaques were made following the procedure of Example 14 except that unmodified 2-methyl-1,5-pentanediamine (MPDA) was used in Example 16 as the curative and AEP was used in Example 17. Both plaques were opaque and light yellow in appearance. Physical properties of these plaques are reported in Table 3.

TABLE 3

| Exam-ple | Curative from Example | Pts. by Wt. | Tensile (psi) @ Yield | @ Break | Elongation Percent |
|---|---|---|---|---|---|
| 14 | adduct | 45.9 | 2765 | 2501 | 38 |
| 15 | adduct | 36.8 | 4005 | 3300 | 22 |
| 16 | MPDA | 21.0 | 3346 | 3346 | 9 |
| 17 | AEP | 21.0 | 4033 | 3879 | 13 |

The data of Table 3 show that, for the formulation without the reactive diluent, curing with the adduct of the invention produces elongation values two to three times those obtained with the prior art curatives examined. Comparing these data with that of Table 1 shows the advantage of using the curatives of the invention in combination with the reactive diluent in this type of epoxy resin formulation.

EXAMPLE 18

In order to examine the water and chemical resistance of epoxy resins cured as in the foregoing Examples, plaques from selected Examples were immersed in either distilled water or 10% aqueous acetic acid for periods of one to seven days and the percentage weight gain was measured in each case. The results are reported in Table 4.

TABLE 4

| Example | Percent Weight Gain in Water | | | Percent Weight Gain in Acid | | |
|---|---|---|---|---|---|---|
| | 1 Day | 3 Days | 7 Days | 1 Day | 3 Days | 7 Days |
| 7 | 0.4 | 0.5 | 0.7 | 7.6 | 12.7 | 19.2 |
| 8 | 0.3 | 0.5 | 0.7 | 5.4 | 8.9 | 13.2 |
| 15 | 0.5 | 0.8 | 1.0 | 6.9 | 11.2 | 16.7 |
| 11 (AEP) | 1.1 | 1.9 | 2.8 | 52.1 | 117.3 | 115.9 |
| 13 (AEP) | 1.2 | 1.9 | 2.7 | 21.8 | 38.9 | 55.5 |

As reported in the foregoing Examples, Example 7 used the MIBK adduct, the butyl acrylate/maleic anhydride copolymer, and reactive diluent. Example 8 used the acetophenone adduct, the butyl acrylate/acrylic acid copolymer, and reactive diluent. Example 15 used the MIBK adduct, butyl acrylate/acrolein copolymer, but no reactive diluent. Comparative Example 11 used AEP, butyl acrylate/acrylic acid copolymer, and reactive diluent, while Comparative Example 13 used AEP, butyl acrylate/acrolein copolymer, and reactive diluent. The use of curatives of the invention show a clear advantage over the use of AEP in providing water resistance to the cured resin. The difference in acid resistance provided by the invention is quite surprising, being from 4 to 10 times more effective than AEP in this regard.

EXAMPLE 19

The adducts of the invention offer the further advantage over AEP in providing longer gel times for the curable mixtures of epoxy resin. This is particularly important in field applications where there is less control over times between mixing and use of the formulations. This difference was demonstrated by curing an 80/20 mixture of diglycidyl ether of bisphenol A having an EEW of 190 and a $C_{12}$ to $C_{14}$ monoglycidyl ether diluent with AEP and with an adduct of 2-methyl-1,5-pentanediamine and methyl isobutyl ketone made as described in Example 1, and with blends of AEP and the adduct. Gel times for a 150 g mass were measured in minutes and are reported in Table 5.

TABLE 5

| Percent AEP | Percent Adduct | Gel Time (min.) |
|---|---|---|
| 100 | 0 | 37 |
| 80 | 20 | 49 |
| 50 | 50 | 106 |
| 0 | 100 | 882 |

COMPARATIVE EXAMPLE 20

In order to explore the importance of the particular diamine used in the invention to prepare the adduct, a different adduct was prepared using methyl isobutyl ketone and AEP instead of 2-methyl-1,5-pentanediamine. This adduct was then used as a partial replacement for AEP in a curing recipe for epoxy polymer containing 17.4 parts by weight of diglycidyl ether of bisphenol A having an EEW of 190, 11.5 parts of a 90/10 copolymer of butyl acrylate and acrylic acid, 4.3 parts of the AEP-MIBK adduct, and 3.24 parts of AEP. A plaque molded from this formulation with curing at 70° C. for 20 hours was opaque and light yellow in color. It had a tensile at yield of 2810 psi, tensile at break of 2810 psi, and an elongation of 4.4 percent. It is apparent, therefore, that both the defined diamine and ketone or aldehyde are necessary to prepare the adduct which offers enhanced flexibility according to the invention.

Modification of the defined diamine provides the formulator with a wide choice of flexibilizing additive due to the increased compatibility afforded through the use of the curative of the invention in curing epoxy resins. In addition, water and chemical resistance, a critical attribute in many coating applications, is dramatically increased by the invention over the widely used trifunctional amine curative, AEP. An auxiliary benefit of the invention, particularly for the adduct of 2-methyl-1,5-pentanediamine, is lower toxicity owing to lower vapor pressure of the curative, lower corrosivity, and very low viscosity of formulations containing these modified amines.

Particularly favored for the advantages offered, is the use of the amine adduct curative in combination with the low molecular weight functional polyacrylates in epoxy resin formulations. This combination is further enhanced by including in the epoxy recipe the monofunctional amine-reactive diluent to obtain epoxies with improved flexibility, compatibility and resistance to moisture and chemicals.

Other advantages, features and embodiments of our invention will be apparent to those skilled in the art from the foregoing disclosure without departing from the spirit or scope of the invention.

We claim:

1. A process for making a flexible epoxy resin composition which comprises reacting a polyepoxide having a 1,2-epoxy equivalence greater than one with one or more trifunctional amines having the structural formula:

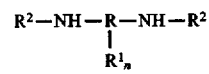

wherein: R is a straight chain alkylene group having 4 to 6 carbons, $R^1$ is alkyl having 1 to 4 carbons, n is 1 or 2, one $R^2$ is alkyl or aralkyl having 5 to 15 carbons, and the other $R^2$ is H.

2. The process of claim 1 wherein said composition also includes as a flexibilizer an acrylate copolymer.

3. The process of claim 2 wherein said composition also includes as a diluent a monofunctional reactive epoxy or acrylate compound.

4. The process of claim 1 wherein in said amine one $R^2$ is hydrogen and the other $R^2$ has 6 to 13 carbons, R has 5 carbons, $R^1$ is methyl, and n is 1.

5. The process of claim 1 wherein said amine is a monoalkylated adduct of 2-methyl-1,5-pentanediamine and an aldehyde or ketone selected from methyl isobutyl ketone, acetophenone, benzaldehyde, 2-ethylhexanal, or 2-tridecanone.

6. An epoxy resin composition made by the process of claim 1.

* * * * *